United States Patent
Gutierrez et al.

(10) Patent No.: US 12,054,674 B2
(45) Date of Patent: Aug. 6, 2024

(54) TWO-STAGE PROCESS WITH THERMAL CONVERSION

(71) Applicant: UPM-KYMMENE CORPORATION, Helsinki (FI)

(72) Inventors: Andrea Gutierrez, Helsinki (FI); Roel Westerhof, Enschede (NL); Sascha Kersten, Enschede (NL); Bert Heesink, Enschede (NL); Pekka Jokela, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 18/083,650

(22) Filed: Dec. 19, 2022

(65) Prior Publication Data

US 2023/0203381 A1    Jun. 29, 2023

(30) Foreign Application Priority Data

Dec. 23, 2021   (FI) ...................... 20216332

(51) Int. Cl.
    *C10G 1/02*     (2006.01)
    *C10G 1/00*     (2006.01)
    (Continued)

(52) U.S. Cl.
    CPC ............ *C10G 1/042* (2013.01); *C10G 1/002* (2013.01); *C10L 1/08* (2013.01);
    (Continued)

(58) Field of Classification Search
    CPC .................. C10G 1/042; C10G 1/002; C10G 2300/1003; C10G 2300/202;
    (Continued)

(56) References Cited

U.S. PATENT DOCUMENTS

| | | |
|---|---|---|
| 2010/0146847 A1 | 6/2010 | Stevens et al. |
| 2011/0268652 A1* | 11/2011 | Machhammer ......... C07C 37/54 568/438 |
| 2018/0002607 A1 | 1/2018 | Bachmann Nielsen et al. |

FOREIGN PATENT DOCUMENTS

| | | |
|---|---|---|
| WO | 2013135973 A1 | 9/2013 |
| WO | 2014001632 A1 | 1/2014 |

OTHER PUBLICATIONS

Cheng et al., "Producing jet fuel from biomass lignin: Potential pathways to alkyl-benzenes and cycloalkanes," Renewable and Sustainable Energy Reviews, vol. 72, 2017; pp. 673-722.
(Continued)

*Primary Examiner* — Prem C Singh
*Assistant Examiner* — Francis C Campanell
(74) *Attorney, Agent, or Firm* — CANTOR COLBURN LLP

(57) ABSTRACT

The disclosure relates to a process for converting lignin (10) to renewable product (80), wherein the process comprises the following steps; mixing (100) lignin (10) with aqueous solution (20) to obtain a mixture (30); heating (110) the mixture (30) of step (a) to a temperature between 290 and 350° C., under a pressure from 70 to 165 bar, to obtain a first product mix (40); separating aqueous phase (53) and oil phase (50), and optionally gas (51) and solids (52), of the first product mix (40) of step (b); and heating (130) the oil phase (50) of step (c) and solvent (60) to obtain a second product mix (70). The second product mix (70) can be used as such, it can be directed to separation (140) or it can be upgraded. The obtained liquid renewable product is suitable as chemicals, fuel, fuel components or feedstock for fuel production.

26 Claims, 4 Drawing Sheets

(51) Int. Cl.
*C10G 1/04* (2006.01)
*C10L 1/08* (2006.01)

(52) U.S. Cl.
CPC ............ *C10G 2300/1003* (2013.01); *C10G 2300/202* (2013.01); *C10G 2300/4006* (2013.01); *C10G 2300/4012* (2013.01); *C10G 2400/04* (2013.01); *C10G 2400/08* (2013.01); *C10L 2200/0469* (2013.01); *C10L 2270/026* (2013.01); *C10L 2290/06* (2013.01)

(58) Field of Classification Search
CPC .... C10G 2300/4006; C10G 2300/4012; C10G 2400/04; C10G 2400/08; C10G 1/047; C10G 3/40; C10G 3/50; C10G 49/00; C10G 1/008; C10L 1/08; C10L 2200/0469; C10L 2270/026; C10L 2290/06; Y02P 30/20; C08H 8/00; C07G 1/00

USPC ....................................................... 585/240
See application file for complete search history.

(56) References Cited

OTHER PUBLICATIONS

Schutyser, W. et al., "Chemicals from lignin: an interplay of lignocellulose fractionation, depolymerisation, and upgrading," Chem. Soc. Rev., vol. 47, 2018; 59 pages.

Wang et al., "Study on two-step hydrothermal liquefaction of macroalgae for improving bio-oil," Bioresource Technology, vol. 319, 2021; 9 pages.

Xu et al., "Biocrude Upgrading in Different Solvents after Microalgae Hydrothermal Liquefaction," Industrial and Engineering Chemistry Research, vol. 60, 2021; pp. 7966-7974.

* cited by examiner

TWO-STAGE PROCESS WITH THERMAL CONVERSION

CROSS REFERENCE TO RELATED APPLICATION

This application claims priority to Finnish Patent Application No. 20216332 filed Dec. 23, 2021, which is fully incorporated herein by reference.

FIELD OF THE DISCLOSURE

The present disclosure relates to a process for converting lignin to renewable product and more particularly to treating lignin feedstock with aqueous solution to obtain a mixture, heating the mixture once to obtain a first product mix, separating one or more of gas, aqueous phase, oil phase and solids from the first product mix and heating the oil phase and optionally solids further to obtain a second product mix. The second product mix can be used as such, it can be directed to separation or it can be upgraded. The obtained liquid renewable product is suitable as fuel, fuel components or as feedstock for fuel and chemicals production.

BACKGROUND OF THE DISCLOSURE

Biomass is increasingly recognized as a valuable feedstock to be used as a sustainable alternative to petroleum for the production of biofuels and chemicals.

Renewable energy sources represent the potential fuel alternatives to overcome the global energy crises in a sustainable and eco-friendly manner. In future, biofuels and biochemicals may replenish the conventional non-renewable energy resources due to their renewability and several other advantages.

Biofuels and biochemicals are typically manufactured from feedstock originating from renewable sources, including oils and fats obtained from plants, animals, algal materials and fish. One source is lignocellulosic biomass, which refers to plant biomass that is composed of cellulose, hemicellulose, and lignin. Biofuels and biochemicals originating from lignocellulosic biomass can replace fossil fuels from an energy point of view. However, the conversion of cellulose and hemicellulose into fuels and chemicals often leaves lignin as a by-product and lignin removed by the kraft process is traditionally burned for its fuel value, providing energy to power the mill. After cellulose, lignin is the most prevalent biopolymer on earth, but in contrast to other polymers, lignin is more resistant to degradation. Although, utilization of lignin as a renewable polymeric material is recognized, lignin utilization is still limited.

Converting biomass into renewable fuels and chemicals usually involves thermal treatment of the biomass and a promising technology is Hydrothermal Liquefaction (HTL). Hydrothermal liquefaction is usually carried out with liquid water at temperatures between 320° C. and 400° C. To keep the water in the liquid or supercritical state very high operational pressures of 200 bar or above are needed.

Despite the ongoing research and development in the processing of feedstocks and manufacture of fuels and chemicals, there is still a need to provide an improved process for converting biomass, particularly lignin, to valuable chemicals and hydrocarbons suitable as fuels or fuel blending components.

BRIEF DESCRIPTION OF THE DISCLOSURE

The invention provides methods for producing liquid renewable product(s) from lignin. The method generally involves providing multiple thermal conversion treatments at moderate temperatures and reaction pressures to produce a renewable product consisting mainly of oxygen containing hydrocarbons which can be used as such or can be upgraded.

The disclosure is based on the idea of using a two-stage process comprising two thermal conversion steps that are both operated at moderate pressure, especially a process comprising a first stage of hydrothermal liquefaction followed by a second stage of thermal upgrading by solvolysis. In the first stage of the process the lignin feedstock is liquefied whereas in the second stage, upgrading reactions e.g. deoxygenation take place yielding an oil with low oxygen content.

An advantage of the process of the disclosure is that the two-stage process is suitable for different lignin feedstocks and that in a multi-stage process the lignin is processed at less severe conditions. Thus, the main challenges of prior art hydrothermal liquefaction are avoided, i.e. feeding of the reaction slurry to the reactor at high pressures and temperatures, operating at high pressures associated with the presence of water at high temperatures, operating near supercritical temperature and pressure of water and recovering product at high pressure. The process of the disclosure is easier and more reliable to operate as the pressures are lower. Moreover, at high temperatures and pressure of water, or at conditions close to the ones where the water is supercritical, the salts present in the feed precipitate and blockage the equipment. Using a two-stage process at mild conditions, the precipitation of salts can be avoided. Further, special materials needed due to harsh conditions, resulting in high investment costs for HTL plants, can be avoided.

In contrast to using solid biomass feedstock, feeding of the lignin feedstock is easier and particles are easily suspending in an aqueous phase before thermal conversion treatment. Further, if kraft lignin is used, the separation of kraft lignin takes place before the hydrothermal liquefication process and thus the cooking chemicals are returned to the pulping process at an earlier stage before the hydrothermal liquefication.

The cost-effective biomass conversion process of the disclosure allows the use of lower temperatures and milder conditions. Also, separation of different phases after the different steps of the process is easier and more economic. Further, no drying of the lignin is needed prior to the conversion.

Recycling of the aqueous phase separated after the hydrothermal liquefication decreases the amount of fresh water needed. Alternatively, or in addition if the feedstock is kraft lignin, the utilization of kraft lignin allows integration to a pulp mill by optional return of hydrothermal liquefaction aqueous phase to the pulp mill.

Further integration of a pulp mill with the process for converting lignin to a renewable product is achieved when lignin is extracted from black liquor, the liquid separated from pulp in kraft pulping. Extracting the lignin from the back liquor also causes off-loading of the recovery boiler of the pulp mill.

Recycling a fraction, such as a light fraction, obtained after fractionation of the oil, as solvent in the thermal upgrading step increases the oil yield and helps avoiding formation of coke and undesired polymerization reactions in the thermal upgrading step. Further, the amount of oxygen in the oil products decreases. By adjusting process conditions, the oxygen content and cracking of the oil products can be altered where lower oxygen contents and less large molecules correspond to a better quality product.

In order to reduce the consumption of external energy, heat from one or more product streams can be used to heat up feed streams.

The process of the disclosure is especially suitable for converting lignin to valuable products or components, such as hydrocarbons and/or oxygen containing hydrocarbons suitable as fuels, fuel blending components or as feedstock for fuels and for chemicals production.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1:
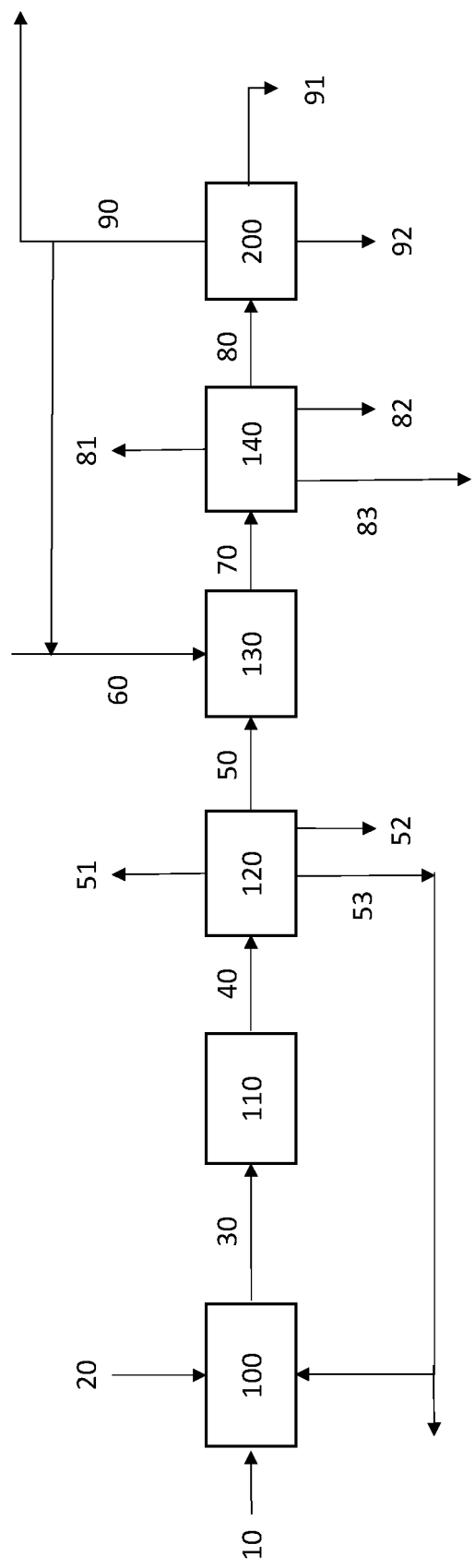
FIG. 1 is a schematic flow diagram representing one embodiment of the two-stage process.

An industrially effective and sustainable process for recovering renewable products from lignin is provided, where yield loss is minimized, and the feedstock is effectively and economically converted to renewable products. The product and especially fractions thereof are particularly suitable as feedstock for hydroprocessing in biofuels and biochemicals manufacture.

A two-step process is proposed that comprises two thermal conversion steps that are both operated at moderate pressure making the process easier to operate at lower costs.

According to embodiments of the disclosure the first step of the process is pretreating lignin by mixing it with aqueous solution, under ambient conditions or at a temperature below 100° C., in order to suspend the lignin. The aqueous solution is preferably water or recirculated aqueous phase, mixed with the lignin at atmospheric conditions (NTP, 20° C. and 101.325 kPa) or at a temperature lower than 100° C. The reaction time, or the residence time in case of continuously operated reactors, of the mixing step is typically 1-60 minutes, preferably 1-10 minutes, most preferably 5-10 minutes. The mixing of the feedstock can be facilitated by mechanical treatment using different kind of mechanical equipment such as stirrer, pump etc. The obtained mixture is pumpable, and it is fed to a first thermal conversion step which is hydrothermal liquefaction where the mixture is heated to a temperature between 290 and 350° C. At this temperature the pressure increases up to between 70 (7 MPa) and 165 bar (16.5 MPa). A first product mix is obtained and from this product mix comprising solids, aqueous phase, oil phase and possibly gas at least the aqueous phase and the oil phase are separated from each other. The solids, if present and separated, are typically unconverted heavy compounds of lignin or the result of polymerization at the reaction conditions. Typically, the separated solids form a cake comprising oil. In order to increase the oil yield, this oil is optionally separated from the solids by washing or separating by steam. The solids can also remain in the oil phase which is treated further in a second thermal conversion step by thermal upgrading. The aqueous phase is optionally recirculated back to be mixed with new feedstock. If the temperature of the hydrothermal liquefaction step is increased, the amount of solids decrease and the amount of organics in the aqueous phase typically increases. The oil phase is treated further in a thermal upgrading step at 360-450° C., under a pressure from 1 to 120 bar (0.1 to 12 MPa). A second product mix is recovered, and the second product mix can be used as a renewable product as such or it can be further upgraded. The second product mix obtained from the thermal upgrading step can optionally be directed to a second separation step, typically comprising washing and filtration where char is separated. Typically, if an aqueous phase is formed during the thermal upgrading step, it is separated from the product before the product mix or a fraction of the product mix is recirculated. In a preferred embodiment no solids are left to be separated from the second product mix. Preferably the solids, if any, have been separated after the hydrothermal liquefaction step.

According to an embodiment of the disclosure the second product mix or the renewable product, is then directed to fractionation, separating a light fraction and a heavy fraction as well as optionally gases and a bottom residue fraction. The fractionation may be for example fractional distillation utilizing at least one fractionation distillation column. Optionally part of the light fraction is upgraded by hydroprocessing and optionally at least part of the light fraction is used as solvent in the thermal upgrading step of the process, thus avoiding formation of coke and undesired polymerization reactions. Optionally at least part of the second product mix or the renewable product, is directed to hydroprocessing, such as hydrotreatment or hydrocracking instead of or in addition to being directed to fractionation. Optionally at least part of the second product mix, typically the light fraction, is recirculated back to the thermal upgrading step.

In the present specification and claims, the following terms have the meanings defined below.

The term "lignin" as used herein, refers to lignin feedstock obtained from different sources. One example is kraft lignin obtained from kraft pulping but the lignin could also be obtained from other sources such as lignosulfonate lignin, soda lignin, organosolv lignin and lignin obtained from lignocellulosic ethanol process. More in general lignin is a complex long-chain heterogeneous organic polymer composed largely of phenylpropane units which are most commonly linked by ether bonds. Oxidative coupling of primarily three p-hydroxycinnamyl alcohols (monolignols): p-coumaryl, coniferyl and sinapyl alcohols results in lignin. Lignin have generally been classified into three major groups based on the chemical structure of their monomer units: softwood lignin, hardwood lignin, and grass lignin. Hardwood lignin consists mainly of guaiacyl and syringyl units and low levels of p-hydroxyphenyl. Conifer lignin has higher levels of guaiacyl units and low levels of p-hydroxyphenyl. Grasses comprise guaiacyl, syringyl and p-hydroxyphenyl units. In some embodiments of the disclosure, the feedstock is typically kraft lignin, which is separated from black liquor. The kraft lignin feedstock of the embodiments of the disclosure essentially consists of lignin, i.e. the feedstock is substantially free of impurities or residues from black liquor, such as cellulose, hemicellulose, methanol, sulphur compounds and cooking chemicals from the kraft process.

The term "aqueous solution" is the solvent mixed with lignin before directing the mixture to hydrothermal liquefication. According to the disclosure the aqueous solution used is typically water or recirculated aqueous phase. Since increasing the pH and ash content is not desired, no salts are added.

The term "mixture" is the heterogeneous or homogenous mixture obtained after the mixing of lignin and aqueous solution according to the disclosure. The mixture can be a slurry, a suspension or any other kind of pumpable mixture.

The term "crude oil" is the first oil phase obtained after separation of at least an aqueous phase and an oil phase from the first product mix obtained from the hydrothermal liquefaction step of the process. The oil phase is treated further in a thermal upgrading step. The crude oil may include all or some solids of the first product mix.

The term "solvent", as used herein, refer to the solvent used in the thermal upgrading step of the process. The solvent or a part thereof, is typically recirculated from the process itself, typically a fraction such as a light fraction separated from the second product mix.

According to the embodiments of the disclosure, the temperature of the hydrothermal liquefaction step is adjusted to a temperature selected from between 290° C. and 350° C., more preferably between 300° C. and 340° C., including the temperature being a temperature between two of the following temperatures; 290° C., 295° C., 300° C., 305° C., 310° C., 315° C., 320° C., 325° C., 330° C. 335° C., 340° C., 345° C. and 350° C. for the heating of the mixture of the mixing step at a pressure from 70 to 165 bar, preferably from 90 bar to 140 bar, more preferably 100 bar to 120 bar, including the pressure being between two of the following pressures; 70 bar, 80 bar, 90 bar, 95 bar, 100 bar, 105 bar, 110 bar, 115 bar, 120 bar, 130 bar, 140 bar, 150 bar, 160 bar and 165 bar. In the first separation step one or more of the different elements of the first product mix, i.e. the product obtained from the hydrothermal liquefaction step, are separated. The first product mix is typically a mixture of gas, aqueous phase, oil phase and solids and typically at least an aqueous phase and an oil phase are separated. The oil phase optionally contains solids comprised in the first product mix. At the thermal upgrading step the temperature is adjusted to a temperature selected from between 360° C. and 450° C., preferably between 370° C. and 410° C., more preferably between 380° C. and 400° C. including the temperature being a temperature between two of the following temperatures; 360° C., 370° C., 375° C., 380° C., 385° C., 390° C., 395° C., 400° C., 410° C., 420° C., 430° C., 440° C. and 450° C. for heating the oil phase obtained in the first separation step together with a solvent, typically chosen from renewable hydrocarbons, oxygen containing hydrocarbons and/or mixtures thereof. The renewable hydrocarbons or oxygen containing hydrocarbons preferably used as solvent can be from the process itself, typically a light fraction separated from the second product mix and/or for example crude tall oil, acid oil and/or vegetable oil. Suitable vegetable oil is for example Brassica carinata oil and/or Jatropha oil. Typically, at solvolysis conditions at the thermal upgrading, the added solvent will not react, so it can be sent back to solvolysis as part of the light fraction. The oil yield of the thermal upgrading is almost 100% so, there is no loss of solvents or oil phase as gases or solids, etc. The oil phase obtained in the first separation step, which is directed to the thermal upgrading step, can either include all or part of the solids of the first product mix obtained in the hydrothermal liquefaction step or all or part of the solids can be separated in the first separation step. The pressure at the thermal upgrading is typically a pressure from 1 bar to 120 bar, preferably from 1 to 100 bar, more preferably from 1 to 50 bar and most preferably from 1 to 20 bar or below 20 bar, including the pressure being between two of the following pressures; 1 bar, 2, bar, 3 bar, 4 bar, 5 bar, 10 bar, 15 bar, 20 bar, 25 bar, 30 bar, 35 bar, 40 bar, 45 bar, 50 bar, 55 bar, 60 bar, 70 bar, 80 bar, 90 bar, 95 bar, 100 bar, 105 bar, 110 bar, 115 bar and 120 bar.

The process of the embodiments of the disclosure, or parts thereof can be carried out batch-wise, semi-batch or in continuously operated reactors. The reaction time, or the residence time in case of continuously operated reactors, of the hydrothermal liquefaction step is typically 3-60 minutes, preferably 5-40 minutes, most preferably 5-30 minutes and of the thermal upgrading step is typically 5-30 minutes, preferably 5-15 minutes, not including respective heating time.

According to an embodiment of the disclosure the aqueous phase separated after the hydrothermal liquefaction step can be recirculated back to be mixed with feedstock in the mixing step to minimize the amount of fresh water.

One way of controlling the process of the embodiments of the disclosure, is measuring the pH of the aqueous phase. If the pH of the aqueous phase is high, for example pH 14, the organics dissolve in the aqueous phase and there is no or less oil phase. At aqueous phase pH 10, the oil phase decreases, and the yield of water soluble organics increases. In order to keep the loss of the organics in the aqueous phase low, the pH of the aqueous phase is typically kept below pH 9, preferably between 4 and pH 9, more preferably between pH 4 and pH 8.5, most preferably between 6 and pH 8 or below pH 8. The pH of the aqueous phase is the result of the amount of salts in the lignin feedstock and the acids formed during the hydrothermal liquefaction step.

In embodiments of the disclosure, the oxygen content of the oil phase is typically below 25 wt %. Preferably the oil phase comprises below 20 wt %, more preferably below 15 wt %, most preferably below 12 wt % oxygen.

In an embodiment of the disclosure, the renewable product comprising oil may be subjected to a fractionation step. A gaseous fraction, if any, a light liquid fraction and a heavy liquid fraction may be obtained. Further, a bottom residue fraction typically comprising solids may be separated. The gaseous fraction typically comprises carbon dioxide, water and $C_1$-$C_4$ compounds. The bottom residue fraction typically comprises large molecules and solids, such as char.

Typical light fractions of the embodiments of the disclosure comprises or consist of 5- and 6-carbon cyclic structures with double bonds or saturated ring, containing keto-groups and/or 1-3-methyl groups, phenolic structures with methyl-, methoxy-, propenyl-, carboxyl-side groups, and hydrated phenantrene 3-ring structures with 3-4 double bonds in the ring and side. The light fraction typically has an average molecular weight of approximately 150 g/mol.

In embodiments of the disclosure, the second product mix or the renewable product may be used as such for example in marine fuel applications or applications relating to heating or it may be directed to a hydroprocessing step.

In further embodiments of the disclosure, the light liquid fraction, obtained by fractionation of the renewable product, may be directed to a hydroprocessing step to obtain hydroprocessed oil, which can be used inter alia in production of chemicals, marine fuel and in drop-in fuels such as diesel, naphtha, and jet-fuel.

Typically, the amount of lignin feedstock is 2-50 wt %, preferably 5-30 wt %, more preferably 10-25 wt %, most preferably 15-20 wt % of the total reaction mixture, i.e. the total amount of lignin and aqueous solution by weight, including the amount of lignin being between two of the following amounts; 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40 wt %, 45 wt %, and 50 wt %.

Typically, the oil phase to solvent ratio in the thermal upgrading step is from 1:5 to 1.5:1 by weight.

In FIG. 1 lignin 10 is fed to a mixing step 100 together with aqueous solution 20. The obtained mixture 30 is then fed to a hydrothermal liquefaction step 110 where it is heated. The first product mix 40 obtained from the hydrothermal liquefaction step 110 is directed to separation step 120 where at least an aqueous phase 53 and an oil phase 50 are separated. At least part of the aqueous phase 53 may optionally be recirculated back to the mixing step 100. The oil phase 50, optionally together with part of the solids, is directed to a thermal upgrading step 130 together with a solvent 60. The second product mix 70 obtained from the thermal upgrading step 130 is directed to a second separation step 140, typically comprising washing and filtration where char/solids 82 is removed and the oil phase 80 is separated. If present, gases 81 and aqueous phase 83 may also be separated. The oil phase 80 is directed to fractionation 200 and/or optionally at least part of the oil phase 80 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 90, a heavy fraction 91 and an optional bottom residue fraction 92 are separated. Optionally at least part of the light fraction 90 is recirculated to be used as solvent 60 in the thermal upgrading step 130. Optionally the light fraction 90 or part of it, is directed to hydroprocessing and/or the heavy fraction 91 is directed to a recovery boiler (not shown in the figure).

Figure 2:
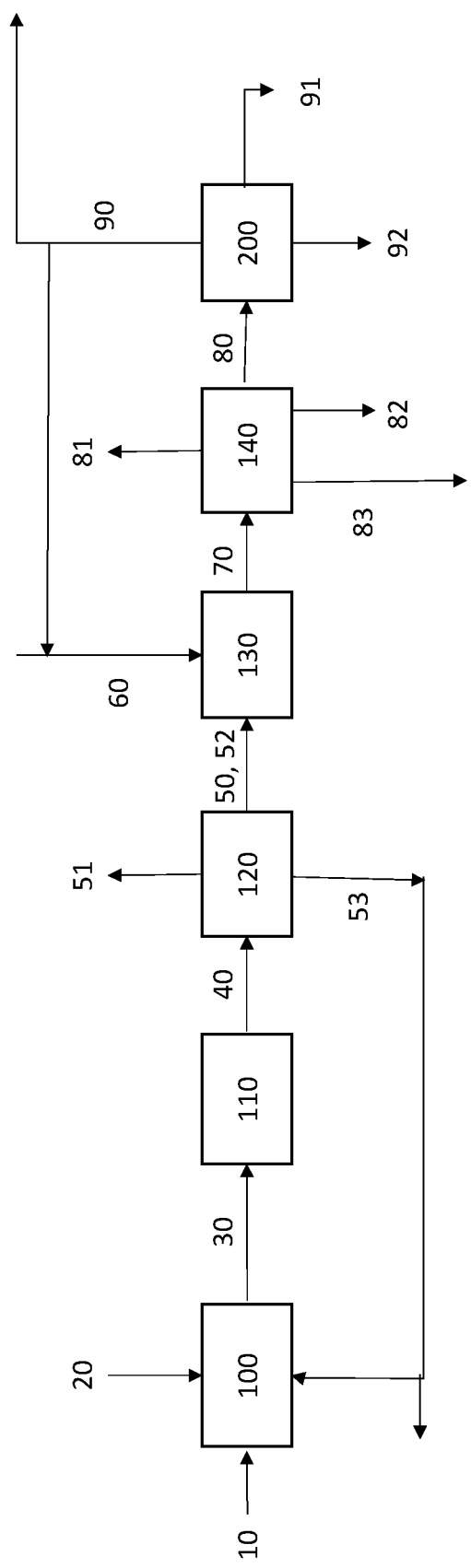
FIG. 2 is a schematic flow diagram representing a further embodiment of the two-stage process.

In FIG. 2 lignin 10 is fed to a mixing step 100 together with aqueous solution 20. The obtained mixture 30 is then fed to a hydrothermal liquefaction step 110 where it is heated. The first product mix 40 obtained from the hydrothermal liquefaction step 110 is directed to separation step 120 where at least an aqueous phase 53 and an oil phase 50 are separated. At least part of the aqueous phase 53 may optionally be recirculated back to the mixing step 100. The oil phase 50 comprising solids 52, is directed to a thermal upgrading step 130 together with a solvent 60. The second product mix 70 obtained from the thermal upgrading step 130 is directed to a second separation step 140, typically comprising washing and filtration where char/solids 82 is removed and the oil phase 80 is separated. If present, gases 81 and aqueous phase 83 may also be separated. The oil phase 80 is directed to fractionation 200 and/or optionally at least part of the oil phase 80 is directed to hydroprocessing, such as hydrotreatment or hydrocracking (not shown). The fractionation step 200 may be for example fractional distillation utilizing at least one fractionation distillation column. An optional gaseous fraction (not shown), a light fraction 90, a heavy fraction 91 and an optional bottom residue fraction 92 are separated. Optionally at least part of the light fraction 90 is recirculated to be used as solvent 60 in the thermal upgrading step 130. Optionally the light fraction 90 or part of it, is directed to hydroprocessing and/or the heavy fraction 91 is directed to a recovery boiler (not shown in the figure).

Figure 3:
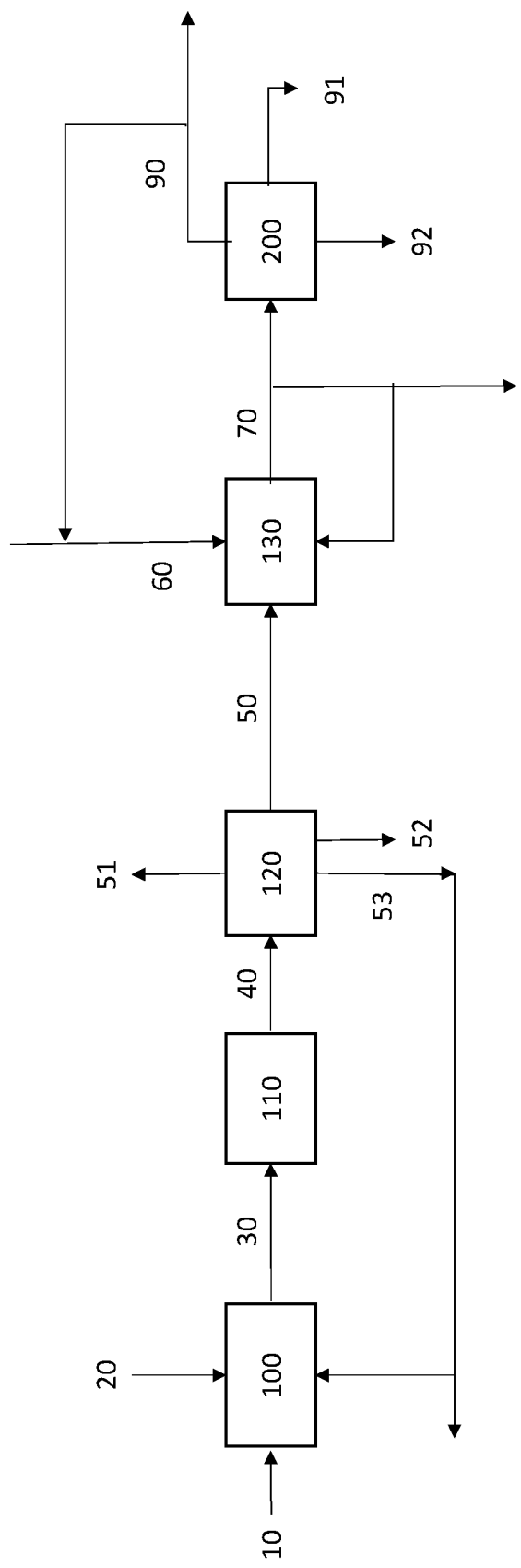
FIG. 3 is a schematic flow diagram representing a further embodiment of the two-stage process.

In FIG. 3 lignin 10 is fed to a mixing step 100 together with aqueous solution 20. The obtained mixture 30 is then fed to a hydrothermal liquefaction step 110 where it is heated. The first product mix 40 obtained from the hydrothermal liquefaction step 110 is directed to separation step 120 where at least an aqueous phase 53 and an oil phase 50 are separated. At least part of the aqueous phase 53 may optionally be recirculated back to the mixing step 100. The oil phase 50, optionally together with part of the solids, is directed to a thermal upgrading step 130 together with a solvent 60. The second product mix 70 obtained from the thermal upgrading step 130 is optionally directed to fractionation 200, directed to hydroprocessing (not shown) and/or optionally at least part of the second product mix 70 is r recirculated back to the thermal upgrading step 130. The fractionation step 200 may be for example fractional distillation utilizing at least one fractionation distillation column. An optional gaseous fraction (not shown), a light fraction 90, a heavy fraction 91 and an optional bottom residue fraction 92 are separated. Optionally at least part of the light fraction 90 is recirculated to be used as solvent 60 in the thermal upgrading step 130. Optionally the light fraction 90 or part of it, is directed to hydroprocessing and/or the heavy fraction 91 is directed to a recovery boiler (not shown in the figure).

Lignin

The lignin feedstock of the embodiments of the disclosure is obtained from different sources and produced in different ways that involves separation of lignin. Examples of different lignin sources are kraft lignin obtained from kraft pulping, lignosulfonate lignin obtained from a sulfite pulping process, soda lignin from pulp mills using a soda pulping process, organosolv lignin where lignin is isolated from carbohydrates in lignocellulosic biomass using organic solvents and lignin obtained in the lignocellulosic ethanol production.

In some embodiments of the disclosure, the lignin feedstock, is obtained from kraft lignin, which essentially consists of lignin, i.e. the feedstock is substantially free of impurities or residues from black liquor, such as cellulose, hemicellulose, methanol, sulphur compounds and cooking chemicals from the kraft process, preferably the lignin feedstock comprises less than 10 wt % of, more preferably the lignin feedstock comprises less than 5 wt % and most preferably less than 1 wt % of impurities or residues from the black liquor. Preferably the lignin feedstock is cellulose-free. Typically, the kraft lignin feedstock comprises below 1 wt %, more preferably below 0.1 wt % of sulphur compounds and cooking chemicals.

The kraft process (also known as kraft pulping or sulfate process) is a process for conversion of wood into wood pulp, which consists of almost pure cellulose fibers, the main component of paper. The process involves the conversion of wood to pulp using an aqueous mixture containing sodium hydroxide and sodium sulphide. These chemicals remove the lignin links between cellulose fibres, thereby releasing the fibres and producing water-soluble compounds. The kraft pulping process is well-known and it is known that it removes most of the lignin originally present in the wood. The liquid separated from pulp is commonly referred to as "crude black liquor" or "weak black liquor". The term "black liquor" refers to the aqueous liquid residue of the kraft pulping process which has been separated from solid wood pulp (cellulose fibres). The black liquor contains dissolved wood degradation products such as lignin and hemicellulose fragments, as well as methanol, sulphur compounds and dissolved inorganic solids such as spent pulping chemicals. The methanol content is typically in the range of 0.5-1.5 wt % based on the mass of dry solids. Sulphur compounds are typically contained in the black liquor in an amount of 2-7 wt % based on the mass of dry solids.

An acidification process has been considered as an efficient and economical process for the isolation of lignin from black liquor. One example of black liquor acidification for lignin extraction is adding acid e.g., sulfuric acid to change the pH of black liquor. Other typical processes for obtaining lignin from black liquor are using filtration and ultrafiltration. In some embodiments of the disclosure, the lignin feedstock is a fraction of lignin chosen based on its molecular weight. Typically, the lignin fractions are obtained by filtration, nanofiltration, acid precipitation process or membrane fractionation. Lignin can be subjected to gradient acid precipitation to obtain lignin fractions with narrow molecular weight distribution. During gradient acid precipitation lignin fractions obtained at higher pH value exhibit higher molecular weight compared with the fractions obtained at lower pH. The fractionation can also be achieved by dissolving lignin in solvent used in the solvolysis, followed by filtration where after a feed mixture of a lignin fraction and solvent is obtained as the filtrate. Since small particles have larger surface area they dissolve better and a lignin fraction with a lower molecular weight is obtained. Typically, the average molecular weight of the lignin feedstock, typically the fraction of lignin, is below 6500 g/mol, preferably below 4000 g/mol, more preferably below 2000 g/mol, most preferably below 1500 g/mol.

The molecular weight distribution of the lignin feedstock or the lignin fraction and the product oil phase can for example be determined using Gel Permeation Chromatography (GPC). GPC is an analytical technique that separates dissolved macromolecules by size based on their elution from columns filled with a porous gel. GPC/SEC employs a stagnant liquid present in the pores of beads as the stationary phase, and a flowing liquid as the mobile phase. The mobile phase can therefore flow between the beads and also in and out of the pores in the beads. The separation mechanism is based on the size of the polymer molecules in solution. Bigger molecules will elute first. Small molecules that can enter many pores in the beads take a long time to pass through the column and therefore exit the column slowly. To determine the molecular weights of the components of a polymer sample, a calibration with standard polymers of known weight must be performed. Values from the unknown sample are then compared with the calibration graph. This method is relative and retention times depends on the used column material, eluent and how similar the used standards are compared to the samples.

A typical lignin feedstock of the embodiments of the disclosure, preferably a kraft lignin feedstock, is a composition comprising 15-98 wt % organics, 0.1-15 wt % ash and/or 1.5-80 wt % water. Typically, the oxygen content of the composition is below 40 wt %, preferably from 20 to 36 wt %, most preferably from 25-36 wt % daf (dry-ash-free). In preferred embodiments of the disclosure; the amount of organics is 30-98 wt %, more preferably 30-70 wt %, most preferably 50-70 wt %; the amount of ash is 0.1-7 wt %, more preferably 0.1-3 wt %, most preferably 0.1-1 wt %, including the ash content being between two of the following values; 0.1 wt %, 0.2 wt %, 0.3 wt %, 0.4 wt %, 0.5 wt %, 1 wt %, 1.5 wt %, 2 wt %, 2.5 wt %, 3 wt %, 3.5 wt %, 4 wt %, 5 wt %, 6 wt %, 7 wt %, 8 wt %, 9 wt %, 10 wt %, 11 wt %, 12 wt %, 13 wt %, 14 wt % and 15 wt %; and/or the amount of water is 20-70 wt %, more preferably 25-70 wt %.

Optional Fractionation of the Second Product Mix or the Renewable Product

The obtained second product mix or the renewable product may optionally be fractionated in a fractionation step. A gaseous fraction, if any, a light fraction and a heavy fraction as well as a bottom residue fraction comprising solids including ash, if any, may be obtained. The fractionation may be carried out after drying of the renewable product.

The gaseous fraction typically comprises water, carbon dioxide and light gaseous ($C_1$-$C_4$) compounds.

The vacuum residue of the second product mix is typically above 10 wt %. The heavy fraction may be directed to hydrocracking, energy production, recovery boiler, etc.

In an embodiment of the disclosure, the second product mix or the renewable product may be directed to a hydroprocessing step without fractionation.

In embodiments of the disclosure, the light fraction, obtained by fractionation of said second product mix or said renewable product, may be directed to a hydroprocessing step and/or at least part of the light fraction may be used as solvent in the thermal upgrading step of the process.

The fractionation may be carried out as evaporation, distillation, extraction, ultra filtration, nanofiltration or as a combination of any of these.

Fractions comprising the gaseous fraction, the light liquid fraction and the heavy liquid fraction can be separated. A person skilled in the art is able to vary the fractionation/distilling conditions and to change the temperature cut point as desired to obtain any desired fraction, boiling in the predetermined ranges.

Alternatively, a combination of different methods may also be used.

Optional Hydroprocessing Step

In the embodiments of the disclosure, the second product mix, the recovered renewable product comprising oil or the light fraction may be subjected to a catalytic hydroprocessing step carried out in the presence of hydrogen, to yield an effluent, which may be subjected to a second fractionation and/or further processing steps for providing liquid fuels and other chemicals. Gasoline fractions that can be used as a bio-naphtha component or as raw material for bio-plastics may also be produced.

The hydroprocessing step may be carried out for effecting at least one of hydrodeoxygenation, hydrodewaxing, hydroisomerization, hydrocracking, hydrodearomatization and ring opening reactions.

In an embodiment, the renewable product, or liquid light fraction obtained by fractionation of the renewable product, may be subjected to a catalytic hydroprocessing step carried out in the presence of hydrogen, to yield an effluent. Said effluent may be subjected to fractionation and/or further processing steps for providing liquid fuels and other chemicals.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina (Al2O3), gamma-alumina, zeolite-alumina, alumina-silica (SiO2), ZrO2, alumina-silica-zeolite and activated carbon. Suitably a mixture of CoO and MoO3 (CoMo) and/or a mixture of NiO and MoO3 (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of $H_2$/feed varies between 600 and 4000 NI/I, suitably of 1300-2200 NI/I.

The feed is pumped to the hydroprocessing reactor at a desired speed. Suitably the feed rate LHSV (liquid hourly space velocity) of the feed material is in the range of 0.01-10 h−1, suitably 0.1-5 h−1.

The hydroprocessing step may be carried out as at least one-step process or as at least two-step process.

The liquid hydrocarbon stream obtained from the hydroprocessing includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

EXAMPLES

Analysis Methods Used in the Examples

Gas samples were analysed with an off-line Varian rapid gas chromatograph RGA-450GC with two analytical columns (10 m Molsieve 5A and 10 m PPQ), and with an off-line Agilent 7890A gas chromatograph equipped with three analytical columns and three different detectors (0.9 m Supelco 12255 U column and TCD detector for the quantification of CO2 and H2S, 10 m DB1 column and FID detector for the quantification of light hydrocarbons and, 10 m Moisieve 5A column and TCD detector for the quantification of O2, H2, N2 and CO), using helium as carrier gas in all cases.

The molecular weight distribution of the oil phase was determined with a Gel Permeation Chromatograph (GPC) of the Agilent 1200 series, applying IR and UV light (wavelength 254 nm) and 3 GPC PLgel 3 Im MIXED-E columns placed in series. The columns were operated at 40° C. and tetrahydrofuran (THF) was used as a solvent. Calibration was performed with a solution of polystyrene with molecular weights ranging from 162 to 30230 g/mol. The results were integrated, and the weight average molecular weight Mw is reported as integers.

Calculation of Average Molecular Weight $$M_w = \frac{\sum w_i M_i}{\sum w_i} \quad \text{(Eq. 1)}$$

where: $M_i$ is the molecular weight of molecules i, $w_i$ is the mass of the molecules with molecular weight I and $M_w$ is weight average molecular weight.

The elemental composition of the liquid and solids was determined with an Interscience Flash 2000 elemental analyser. The water content of the aqueous phase was determined by Karl Fischer titrations using Hydranal composite 5, Metrohm 787 KFTitrino as titrant. The pH of the aqueous phase, obtained after the experiments, was measured with a Metrohm 785 DMP titrino apparatus.

The contents of ash, volatile matter, moisture and fixed carbon in the lignin (proximate analysis) were determined by measuring weight loss upon heating. These constituents will add up to 100%. Ash content determination was performed by heating a lignin sample in air at a slow heating rate (5° C./min). Once the temperature reached 550° C. it was kept constant for 24 hours before the sample was weighted. The remaining weights measured at 520° C. represent the ash contents at these temperatures.

The combined content of fixed carbon and volatiles was determined by slowly heating a lignin sample (5° C./min) in nitrogen to 950° C. where it was maintained for 10 minutes before it was weighted. The measured weight loss represents the combined content of water and volatiles. The remaining weight represents the content of fixed carbon.

The moisture content of the lignin was determined by a PMB-53 moisture analyzer of Adam Equipment.

Calculations of Mass Balance and Yields

The mass balance distinguishes four different product phases—oil (o), aqueous phase (aq), gas (g) and solids (s). The produced amounts of each phase are determined as follows:

1. Oil—The amount of organics remaining in the recovered oily phase and corrected by subtracting the known water content in the oil obtained by Karl Fischer titration
2. Water soluble organics (WSO)—Is obtained by subtracting water from the aqueous phase. The water content of the aqueous phase is measured using Karl Fischer titration.
3. Gas—From the known volume of produced gas and GC composition, the weight of total gas is calculated and the amount of measured $N_2$ is subtracted. The known volume of produced gas and the average molar weight of 33 g/mol are used to estimate the amount of gas produced. Nitrogen is subtracted based on the initial pressure and the approximate initial volume taken up by gas phase in the reactor at the start of an experiment.
4. Solids (char)—The amount of solids is determined directly by weighing dried solids when withdrawn from the oven.

Since all yields are given on dry lignin basis, the amount of dry lignin fed in the autoclave is corrected for initial lignin moisture as follows:

$$m_{lignin,dry} = m_{lignin} \cdot (1 - w_{moisture,lignin}) \quad \text{(Eq. 2)}$$

The yields are calculated by:

$$Y_{product} = \frac{m_{product}}{m_{lignin,dry}} \quad \text{(Eq. 3)}$$

$Y_O$ is used for the oil yield, $Y_{AQ}$ for the aqueous phase organics, $Y_S$ for the solids and $Y_G$ for the gas. Subsequently, the balance closure is expressed as the sum of all four product yields.

When the oil or solids are treated in the second stage, the solid and gas yields are based on the whole feed in (solids or gas and the light phase), $$Y_{product} = \frac{m_{product}}{m_{solids+light\ phase,dry}} \quad (Eq.\ 4)$$

When in the second stage it is based on only the solids or oil feed in (values between brackets), all the gas and solid production are solely ascribed to the oil/solid content in the light phase feed. The oil yield is calculated as 100 minus gas and solids.

Vacuum Residue and Average Molecular Weight

Both vacuum residue (VR) and average molecular weight ($M_W$) are excerpted from GPC analysis. The parameters are based on the results from the refractive index detector (RID) of the GPC analyser. Molecular weight is taken directly from the GPC output file, whereas vacuum residue is calculated as follows:

$$VR = \frac{\text{Area of molecules heavier than 1000 g/mol}}{\text{Total Area}} \times 100 \quad (Eq.\ 5)$$

The areas are calculated using numerical integration (trapezoidal method).

$$\text{Area} = \int_{\log M_{W,1}}^{\log M_{W,2}} RID\ d(\log M_W) \quad (Eq.\ 6)$$

Oxygen Content

With the applied recovery procedure, a small fraction of water always remained in the oil phase. Therefore, the oxygen content is corrected for the oxygen in water. The water content of the oil sample ($KFT_{oil}$ in wt %) is known from Karl Fischer titration and therefore the obtained oxygen content including that of water ($O_{wet}$) can be corrected to obtain the oxygen content of the oil on dry basis (O):

$$O = \frac{O_{wet} - \frac{16}{18} \cdot KFT_{oil}}{\left(1 - \frac{KFT_{oil}}{100}\right)} \quad (Eq.\ 7)$$

The same procedure holds for the hydrogen content in the oil:

$$H = \frac{H_{wet} - \frac{2}{18} \cdot KFT_{oil}}{\left(1 - \frac{KFT_{oil}}{100}\right)} \quad (Eq.\ 8)$$

Example 1. Hydrothermal Liquefaction Step at 320° C.

15 wt % kraft lignin of Table 1 and 85 wt % water was mixed at atmospheric conditions and the mixture was directed to the HTL step ($1^{st}$ stage). The reactor temperature of the HTL step was 320° C. and the reaction time 20 minutes (at set-point). The product yields and oil composition are presented in Table 2. The pressure was maximally 100 bar. A high oil yield of 51 wt % was obtained. The solids yield was 30 wt %. The oxygen content was 20 wt %. The lignin feedstock had an average molecular weight of 3406 g/mol and the oil had an average molecular weight of 2169 g/mol.

TABLE 1

| Kraft lignin composition | |
| --- | --- |
| Ash, wt % | <1 |
| Organics, wt % | 64 |
| Moisture, wt % | 35 |
| pH (mixed with water) | 2.5-3.8 |
| Molecular weight Mw, g/mol | 3406 |

TABLE 2

Product yields and oil composition of $1^{st}$ stage HTL of lignin at 320° C. for 20 minutes

| | Liquid yield wt %, dry | Solid yield wt %, dry | Gas yield wt %, dry | WSO yield wt %, dry | Oxygen wt %, dry | Mw g/mol | VR % |
| --- | --- | --- | --- | --- | --- | --- | --- |
| HTL oil ($1^{st}$ stage) | 51 | 30 | 4 | 5 | 20 | 2169 | 56 |

For comparison, the distillation cut was also subjected to thermal upgrading conditions and the results are shown in Table 3. The distillation cut was obtained from distillation of the oil product in vacuum at 180° C. In the distillation process two fractions were obtained, a light fraction (12 wt % of the oil) and an oil residue (88 wt % of the oil). As can be observed, the distillation cut does hardly produce any solids or gas and is quite stable.

TABLE 3

| Characteristics of the distillation cut used as solvent | | | | | |
| --- | --- | --- | --- | --- | --- |
| | Oil yield wt % | Solid yield wt %, dry | Gas yield wt %, dry | Oxygen wt %, dry | Mw g/mol | VR % |
| Distillation cut | — | — | — | 15 | 111 | 0 |
| Thermal upgrading of distillation cut | 99 | 0 | 1 | 15 | 151 | 1 |

Example 2. Hydrothermal Liquefaction Step at 300° C. (Example), 340° C. (Example) and 360° C. (Comparative Example)

Lignin 15 wt % of kraft lignin of Table 1 and 85 wt % water was mixed at atmospheric conditions and the mixture was directed to the HTL step (1st stage). The reactor temperature of the HTL step was 300° C. (example), 340° C. (example) and 360° C. (comparative example) and the reaction time 20 minutes (at set-point). The product yields and oil composition are presented in Table 4. The pressure was in the range of 91 to 190 bar. Oil yield 41-42 wt % were obtained. The solids yield decreased with higher temperatures and varied between 24 and 41 wt %. The oxygen content was between 15 and 19 wt %. The lignin feedstock had an average molecular weight of 3406 g/mol. The average molecular weight of the oil is determined and is a result of cracking, repolymerization. Molecules that formed the char are thus excluded from the liquid analyzed. It was observed that the average molecular mass of the liquid decreases with increasing temperature.

TABLE 4

Product yields and oil composition of 1st stage HTL of lignin at 300° C. and 340° C. (examples) as well as 360° C. (comparative example)

| | Liquid yield wt %, dry | Solid yield wt %, dry | Gas yield wt %, dry | WSO yield wt %, dry | Oxygen wt %, dry | Mw g/mol | VR % | Pressure bar |
|---|---|---|---|---|---|---|---|---|
| HTL oil (1$^{st}$ stage) 300° C. | 42 | 41 | 3 | 13 | 19 | 2138 | 54 | 91 |
| HTL oil (1$^{st}$ stage) 340° C. | 42 | 27 | 4 | 12 | 15 | 1015 | 30 | 153 |
| HTL oil (1$^{st}$ stage) 360° C. | 41 | 24 | 5 | 22 | 17 | 911 | 27 | 190 |

Example 3. Effect of pH

Figure 4:
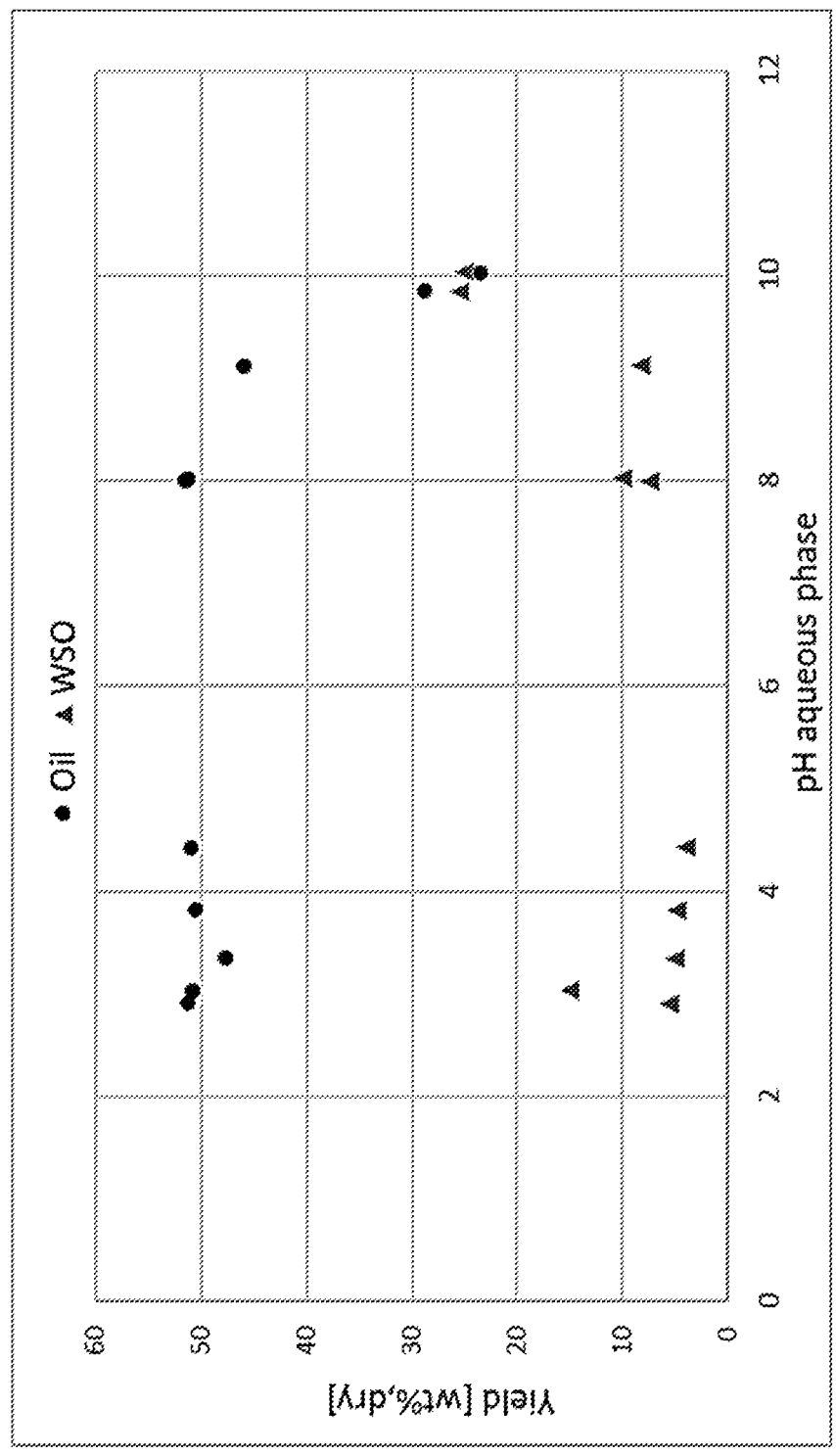
FIG. 4 shows water-soluble organics (WSO) and oil yields as function of pH of the aqueous phase obtained after the hydrothermal liquefaction step.

Lignins with varying ash content (between 0.4 and 15 wt %) and pH (between pH 2.6-13) were used as feedstock for HTL. 15 wt % of dry lignin feedstocks and 85 wt % water was mixed at atmospheric conditions and the mixture was directed to the HTL step (1st stage). The reactor temperature of the HTL step was 320° C. and the reaction time 20 minutes (at set-point). The pressure was maximally 100 bar. The yield of water-soluble organics (WSO) and the yield oil as function of the pH of the aqueous phase obtained after the HTL step is shown in FIG. 4. The pH is of the aqueous phase is the result of the amount of salts in the lignin feedstock and the acids formed during the HTL process. In addition, the oxygen content (e.g. polarity) of the oil product determines how much WSO are produced.

The results show that it is beneficial to keep pH of the aqueous phase below approximately 8 to minimize the amount of organics in the aqueous phase. This value corresponded with a lignin ash content of below 2.5 wt % and pH of the aqueous phase of the feedstock (lignin in water) below pH 10. When the lignin had an ash content, above 2.5 wt % and it is mixed with water and the pH of the water before thermal upgrading is higher than 10, then the pH of the aqueous phase after the HTL step was higher than 8 and more organics dissolved in the aqueous phase, thus decreasing the oil yield.

Example 4. Thermal Upgrading Step

The HTL (1$^{st}$ stage) oil and solids, were thermally upgraded (solvolysis) in a distillation cut (180° C., 15 mbar, lights yield 12 wt %) light fraction as the solvent. The concentration of 1$^{st}$ oil in the distillation cut was 17 wt % on dry basis. The concentration of 1$^{st}$ solids in the distillation cut was 13 wt % on dry basis. Normally, oil and solids are upgraded together, but now they were upgraded separately in order to receive results that could be analysed separately. The reactor temperature of the thermal upgrading step was 380° C. and the reaction time 10 minutes (at set-point). The pressure was 100 bar. The product yields and oil composition are listed in Table 5. The product yields are expressed on total organic intake and only on the 1$^{st}$ stage oil or solids intake (between brackets) In this table also the oxygen content and molecular weight of the feed oil (1$^{st}$ stage) is shown.

When processing 1$^{st}$ stage oil or solids in a distillation cut a high oil yield of 99 wt % and 97 wt % was obtained, respectively. Based on the 1$^{st}$ stage oil or solids input the oil yield are 92 and 76 wt % respectively. From the 1$^{st}$ stage oil, no solids were produced contrary some solids (14 wt %) were produced from the solids. The solids produced a considerable amount of "extra" oil using this thermal upgrading step compared to processing the lignin only at 320° C.

After thermal upgrading in the distillation cut no separate aqueous phase was found. However, the reported oil yields could include some water. The oxygen content of the oils obtained after thermal upgrading (2$^{nd}$ stage) was 14 wt % and 15 wt %.

TABLE 5

Thermal upgrading (solvolysis) of the oil and solids obtained from the 1$^{st}$ stage in a distillation cut light phase. The values between brackets are yields based only on the 1$^{st}$ stage oil or solids intake.

| | Oil yield wt % | Solid yield wt %, dry | Gas yield wt %, dry | Oxygen wt %, dry | Mw g/mol | VR % |
|---|---|---|---|---|---|---|
| HTL (1$^{st}$ stage) oil | — | — | — | 20 | 2169 | 56 |
| HTL (1$^{st}$ stage) oil in distillation cut | 99 [92] | 0 [0] | 1 [7] | 14 | 572 | 14 |
| HTL (1$^{st}$ stage solids) in distillation cut | 97 [76] | 2 [14] | 1 [10] | 15 | 1086 | 19 |

The oil product from this step is fractionated and the light fraction is used as solvent for the second step thermal upgrading. The light fraction can also be hydrotreated or the product from the thermal upgrading step can be hydrotreated as such without fractionation.

The examples presented above were performed in a batch reactor. However, the set-up can also be continuous as presented in FIG. 1-3.

The invention claimed is:

1. A process for converting lignin (10) to renewable product (80), characterized in that the process comprises the following steps,
   (a) mixing (100) lignin (10) with aqueous solution (20), at atmospheric conditions or at a temperature lower than 100° C., for 1-60 minutes to obtain a mixture (30);
   (b) heating (110) the mixture (30) of step (a) at a temperature between 290 and 350° C., under a pressure from 70 to 165 bar, to obtain a first product mix (40);
   (c) separating (120) aqueous phase (53) and oil phase (50), and optionally gas (51) and/or solids (52), of the first product mix (40) of step (b); and
   (d) heating (130) the oil phase (50) of step (c) and solvent (60) at a temperature between 360° C. to 450° C., under a pressure from 1 to 120 bar.

2. The process according to claim 1, characterized in that the aqueous solution (20) in step (a) is water or recirculated aqueous phase (53).

3. The process according to claim 1, characterized in that the amount of lignin feedstock is 2-50 wt % of the total amount of lignin and aqueous solution by weight.

4. The process according to claim 1, characterized in that said solvent (60) in step (d) is renewable hydrocarbons, oxygen containing hydrocarbons or mixtures thereof.

5. The process according to claim 1, characterized in that the oil phase to solvent ratio in step (d) is from 1:5 to 1.5:1 by weight.

6. The process according to claim 1, characterized in that the pH of the aqueous phase (53) is below pH 9.

7. The process according to claim 1, characterized in that lignin (10) is kraft lignin separated from black liquor and the lignin comprises less than 10 wt % of impurities or residues from the black liquor.

8. The process according to claim 1, characterized in that the lignin (10) comprises 15-98 wt % organics; 0.1-15 wt % ash; and/or 1.5-80 wt % water.

9. The process according to claim 1, characterized in that the lignin (10) comprises below 40 wt %, oxygen daf (dry-ash-free).

10. The process according to claim 1, characterized in that step (d) (130) is followed by a step (e) (140) comprising separating aqueous phase (83), oil phase (80) and optionally gas (81) and/or solids (82) of the second product mix (70) of step (d) (130).

11. The process according to claim 10, characterized in that the oil phase (50, 80) comprises below 25 wt % oxygen.

12. The process according to claim 1, characterized in that step (d) (130) is followed by fractionation (200) to obtain a light fraction (90) and a heavy fraction (91) and optionally a bottom residue fraction (92) and/or a gaseous fraction.

13. The process according to claim 10, characterized in that step (e) (140) is followed by fractionation (200) to obtain a light fraction (90) and a heavy fraction (91) and optionally a bottom residue fraction (92) and/or a gaseous fraction.

14. The process according to claim 12, characterized in that the light fraction (90), or part of it, is recirculated to step (d) (130) as solvent (60).

15. The process according to claim 1, characterized in that heating (110) the mixture (30) of step (a) is performed at a temperature from 300° C. and 340° C., and/or at a pressure from 90 bar to 140 bar.

16. The process according to claim 1, characterized in that the heating (130) the oil phase (50) of step (c) is performed at a temperature from 370° C. to 410° C. and/or at a pressure from 1 to 100 bar.

17. The process according to claim 1, characterized in that the heating of step (b) (110) is performed for 3-60 minutes and/or of step (d) (130) is performed for 5-30 minutes.

18. The process according to claim 1, characterized in that heat from one or more product streams is used to heat up feed streams.

19. A renewable product comprising the light fraction (90) of claim 12.

20. The process according to claim 1, characterized in that the amount of lignin feedstock is 5-25 wt % of the total amount of lignin and aqueous solution by weight.

21. The process according to claim 1, characterized in that said solvent (60) in step (d) is crude tall oil.

22. The process according to claim 1, characterized in that the pH of the aqueous phase (53) is 4 to 8.

23. The process according to claim 1, characterized in that lignin (10) is kraft lignin separated from black liquor and the lignin comprises less than 1 wt % of impurities or residues from the black liquor.

24. The process according to claim 1, characterized in that the lignin (10) comprises 30-70% organics; 0.1-1% ash; and/or 1.5-70 wt % water.

25. The process according to claim 1, characterized in that the lignin (10) comprises 20 to 36 wt % oxygen daf (dry-ash-free).

26. The process according to claim 10, characterized in that the oil phase (50, 80) comprises below 20 wt % oxygen.

* * * * *